143701

57

2455/6

Oct. 16, 1951 M. BETTAN 2,571,660

MULTIPLE ANTENNA SYSTEM FOR TELEVISION

Filed Feb. 11, 1950 2 SHEETS—SHEET 1

INVENTOR.
MARTIN BETTAN
BY Leo Edelson
ATTORNEY

EXAMINER

Oct. 16, 1951 M. BETTAN 2,571,660

MULTIPLE ANTENNA SYSTEM FOR TELEVISION

Filed Feb. 11, 1950 2 SHEETS—SHEET 2

INVENTOR.
MARTIN BETTAN
BY Leo Edelson
ATTORNEY

EXAMINER

Patented Oct. 16, 1951 2,571,660

UNITED STATES PATENT OFFICE 2,571,660

MULTIPLE ANTENNA SYSTEM FOR TELEVISION

Martin Bettan, Brooklyn, N. Y., assignor to Multenna Corporation, Philadelphia, Pa., a corporation of Pennsylvania Application February 11, 1950, Serial No. 143,701

8 Claims. (Cl. 250—9)

The present invention relates to antenna coupling systems for the collection and distribution of signals to a plurality of receivers, and more particularly it relates to a multiple unit antenna coupling system for television receivers and the like.

Various signal collection and distribution systems have been provided heretofore for use in apartment houses and other congested areas whereby a plurality of receivers may be served from a fixed distribution system. In a signal distribution system for television receivers it is not only necessary to match the input impedance of the receiver at each outlet of the distribution system, but also it is necessary to prevent energy feedback of signals from the oscillator and other circuits of each receiver into the system and thus to other receivers both directly and through re-radiation.

A further disadvantage of previously known signal distribution systems of the type referred to, is the requirement for signal booster amplifiers as an integral part of the system. Such amplifiers not only add to the cost of the system but also require considerable maintenance.

As is well known, television programs are conveyed through various signal channels having commercially assigned numbers indicating their frequency range, and a further problem in providing for television signal reception comes from the fact that a separate antenna must generally be provided for each channel.

It is a primary object of this invention, to provide an improved and simplified multiple unit antenna coupling system for television receivers and the like, which may provide signals for a relatively unlimited number of television receivers from a single antenna system.

It is a further object of this invention, to provide an improved television antenna coupling system wherein the signal distribution to a relatively large number of television receiver outlets is substantially uniform and entirely devoid of booster amplifiers as an integral part of the system.

It is also an object of this invention, to provide an improved high frequency signal distribution system for television receivers and the like, which is composed entirely of simple coupling units adapted to be connected serially with a single antenna system or array through a single coaxial cable having a simple resistance termination.

In accordance with the invention, a single antenna system or array is located in an elevated, unscreened, position above an apartment house or other dwelling in which a plurality of television or other high frequency receivers are to be located and supplied, and a coupling unit is placed for convenient connection with each individual television receiver. A coaxial cable connection is then run from the antenna system serially through each coupling unit to a terminating impedance of resistance and ground.

Each coupling unit, in accordance with the invention, includes a bridged T network, to the midpoint of which is connected a grounded plate, grounded grid, dual amplifier, terminating in a low impedance output circuit for direct coupling to the input circuit of any suitable television or other high frequency receiver.

Each amplifier and coupling unit is provided with its own power supply means suitably filtered to prevent interaction between the amplifier and the supply means. In addition, the bridged T network and the dual amplifier means provides effective decoupling between the input connection for the television receiver and the distribution system per se. Because of the particular circuit means employed, highly effective decoupling is obtained while at the same time permitting a large number of receivers to be supplied with signal from a single source through a single cable without withdrawing appreciable energy at each outlet. The coaxial cable means serves to connect the antenna array through the bridged-T networks in series to a terminating impedance or resistance having the same ohmic resistance as the cable or distribution system.

From the foregoing consideration of the system, it will be seen that it is a further and important object of the invention to provide a single circuit antenna connection adapted to be provided by a single coaxial cable and means therein, including bridged-T networks in series, providing tapped signal output connections thereon adapted for low energy extraction, thereby to provide a relatively large number of outlets without the necessity for booster amplifiers and the like in the system.

It is also a further object of the invention, to provide an improved multiple unit antenna distribution system for television receivers and the like from a single antenna array which offers a relatively high input impedance at each outlet and a relatively low output impedance for distribution to each television receiver, while at the same time effectively preventing energy feedback from each receiver to the distribution system.

A further object of the invention is also to provide an improved coupling unit for use in a single antenna connection which is self-contained and adapted for relatively low cost of manufacture and ease of installation.

The novel features that are considered to be characteristic of this invention are set forth with particularity in the appended claims. The invention itself, however, both as to its organization and method of operation, as well as additional objects and advantages thereof will best be understood from the following description, when read in connection with the accompanying drawings, in which;

Figure 1:
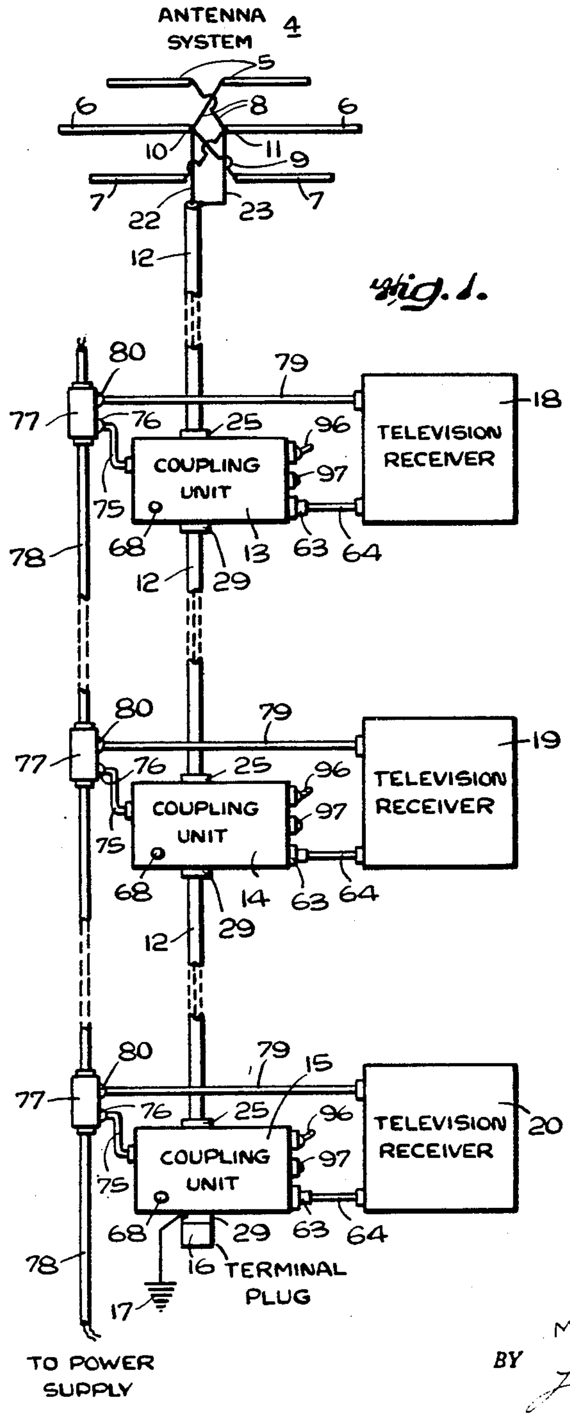
Figure 1 is a diagrammatic representation of a multiple unit antenna coupling system embodying the invention, being in block diagram form to show the overall construction and arrangement.

Referring to Figure 1, an antenna system 4 comprising a plurality of pairs of dipoles 5, 6, and 7, in any required number to cover a predetermined frequency spectrum in bands, are interconnected by matching stub connections 8 and 9, with terminals 10 and 11 from which a coaxial cable 12 extends downwardly through a plurality of coupling units, 13, 14, and 15, to a terminating plug 16 and ground 17. These coupling units may be of any suitable number and represent separate apartment outlets or any suitable outlet points for connection with various numbers of television receivers indicated at 18, 19 and 20 respectively, by way of example.

The antenna system or array 4 includes a plurality of antennas each cut to a specific frequency for each channel servicing the area in which the system is used, to supply signals to the system. The antennas are matched preferably by using ¼ wave, 300 ohm matching stubs 8 and 9 between the antenna dipoles, and taking the signal off at a predetermined point as at 10—11, and feeding it into a coaxial cable 12, which in the present example may be considered to have an impedance of 52 ohms. The coaxial cable center lead 22 and the outer conductor 23 are connected respectively with the terminals 10 and 11 of the center dipole in the present example, which may be for television channel No. 3, whereas the dipoles 5 and 7 may be adjusted for television channels No. 10 and No. 6 for example.

Figure 2:
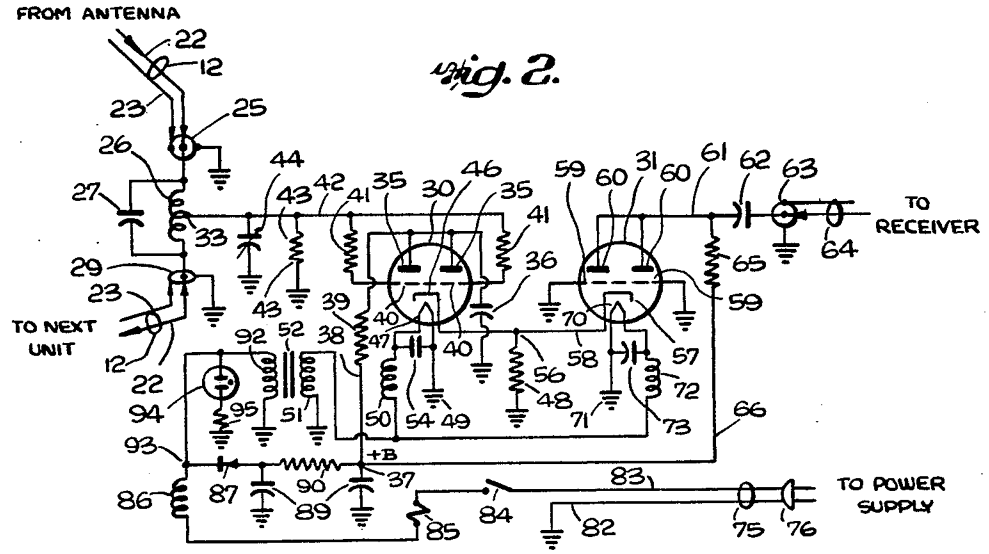
Figure 2 is a schematic circuit diagram of one of the units of the system shown in Figure 1, in accordance with and embodying the invention.

Referring particularly to Figure 2 along with Figure 1, it will be seen that the signal is brought down through the 52 ohm coaxial cable into a coaxial connector 25 and passes from the center conductor 22 through an inductance coil 26 and capacitor 27 combination, into an output coaxial connector 29, and thus on through the cable 12 to the next unit. Also in the unit are two dual triode amplifier tubes 30 and 31 the first providing a cathode follower type of amplifier having a high input impedance with the operating signal therefor taken from a center tap 33 on the inductance coil 26.

Each of the tubes 30 and 31 may be provided by a commercial type tube known as the 6J6, or any other suitable type providing a dual tube structure. In the present example, the tube 30 includes two anodes 35 connected together and effectively connected to ground for television signal potentials through a bypass capacitor 36. Anode current for the operation of the tube is supplied from a positive B-potential supply terminal 37 through a supply lead 38 and a plate resistor 39.

The control grids 40 of the tube are likewise connected in parallel through individual series control resistors 41 with high frequency input lead 42 connected with the center tap 33 on the coil 26. A grid resistor 43 is connected between the lead 42 and ground for the system, while a variable tuning capacitor 44 is connected between the lead 42 and ground. It should also be noted that the fixed capacitor 27 is connected in parallel with the center inductance coil 26.

The tube 30 is provided with a common cathode 46 for both tube sections, having a common heater or filament 47. The cathode is connected to ground through a cathode resistor 48 and one side of the heater is likewise connected to ground, as indicated at 49, while the opposite side is connected through a series choke coil 50 with a heater winding or secondary 51 on a cathode heater transformer 52, the opposite side of the secondary being likewise grounded. It will be noted that a bypass capacitor 54 is connected across the filament or heater 47.

The cathode terminal 56 of the cathode resistor 48 serves as an output terminal for signals applied to the first amplifier tube 30 and is cathode coupled directly to the tube 31 and its cathode 57, through lead 58 connected between the cathode 57 and the terminal 56. Both grids 59 of the tube 31 are connected directly to ground as indicated, so that the cathode and grids are effectively directly connected across the coupling impedance 48 in the cathode circuit of the tube 30. The anodes 60 are connected in parallel to signal output lead 61 which in turn is coupled through an output coupling capacitor 62 to an output cable connector 63 and an outgoing cable 64 for a television receiver such as shown in Figure 1, in which, as well as in the other figures in the drawings, like reference characters refer to like parts throughout.

Signal output coupling is provided through the lead 61 across the impedance provided by an output coupling or plate resistor 65 which is connected between the lead 61 and a positive potential supply lead 66, in turn connected with the high potential supply terminal 37.

The filament or heater 70 of the tube 31 is connected at one side to ground as indicated at 71 and at the other side through a choke coil 72 with the heater winding 51 of the transformer 52, in parallel with the heater 47 of the tube 30. A bypass capacitor 73 is connected across the filament or heater 70 thus providing for a complete bypass of the filament to high frequency signal currents while the choke coil 72, like the choke coil 50, serves to isolate the heaters from the secondary winding 51 at all high frequencies.

These choke coils may conveniently comprise approximately eleven turns of #22 enamel covered wire on a 5/16" diameter, and the bypassing capacitors 54 and 73 may each be provided by ceramic capacitors having a capacitive value of approximately 50 mmfd. With regard to the other values of the circuit elements used in the particular amplifier shown and described, for operation in the television bands above and below 200 megacycles, the variable capacitor 44 may have a value of 7–45 mmfd., and the control re-

EXAMINER sistors 41 and the anode resistor 39 each have a value of 27 ohms, while the grid resistor 43 may have a value of approximately 1 megohm. The cathode resistor 48, in the present example, may be considered to have a value of approximately 75 ohms, and the output coupling resistor 65 may likewise have a value of 3000 ohms in connection with an output coupling capacitor 62 of .003 mfd. As regards the bridged T network elements 26 and 27, in the input circuit, the inductance coil 26 may have a value of .0725 microhenry and the capacitor 27 may have a value of 7.25 mmfd.

From the foregoing description it will be seen that the resistor 43 serves to apply the bias voltage on the grids 40 of the first amplifier tube 30 from the grid resistor 48, and that a D.-C. plate voltage is applied to the plates 35 of the first amplifier tube 30 through the low impedance resistor 39 which, together with the series grid resistors 41 of equal value, prevents the first amplifier tube from oscillating at any operating frequency of the system, which might occur although the plates are effectively at R.-F. ground potential through the shunt effect of the bypass capacitor 36.

As hereinbefore pointed out, the choke coils in the filament circuits filter out any R.-F. currents tuned to the video frequencies and the bypass capacitors provide conduction for any R.-F. currents in the filament circuit to ground.

Signal voltages derived from the series antenna coupling system at the terminals 33 and the grids 40, and amplified, are then reproduced in phase across the resistors 48, and applied directly to the cathodes 57 and the grids 59 of the second amplifier tubes 31, which are used as cathode or grounded-grid amplifiers since the grids 59 are at ground potential. Because of the low ohmic resistance of the output coupling resistors 65 in each unit, the plates or anodes 60 provide a relatively low output impedance adapted for extension through cable connection 64 with any suitable television or other high frequency receiver. Thus a signal applied to the cathode of the second amplifier 31 in each unit is taken off the anodes 60 across the relatively low impedance 65, and is then conveyed through the coupling capacitor 62 to the output terminal of the unit which is provided by the coaxial connection 63, as indicated.

In operation, the tuning capacitor 44 is adjusted for maximum signal output at a frequency of approximately 200 megacycles. Adjustment is provided through an opening 68 in each tuning unit as shown more particularly in Figure 1. This is preferably a screw driver adjustment and need not be changed after it is once set.

Each coupling unit shown in Figure 1 and in Figure 2 in detail, to which attention is further directed, is provided with its own self-contained power supply, rectifying and filter circuit, adapted for connection to standard 110 volt or similar A.-C. or D.-C. commercial source, such as a convenience outlet, along with the receivers to which the signals are supplied by each unit. For example, as shown in Figure 1, the power supply for each coupling unit is shown as being taken through a supply cord 75 having a plug connection 76 with the usual convenience outlet 77 connected with a wiring system 78 of any suitable type. Each television receiver may be likewise connected through a supply cord 79 with a similar plug connector 80, as shown more particularly in Figure 1. This is particularly true where the various coupling units are arranged to be located adjacent to the particular receiver locations, as in various apartments throughout a building, in which case the coaxial cable 12 extends from coupling unit to coupling unit in the same manner as shown in Figure 1, and it is obvious that any suitable arrangement may be provided whereby the individual receivers may be served with both operating current and signal from parallel current and signal distribution connections although not necessarily so. The present distribution system is particularly adapted for providing for extending lead connections to each receiver, since the output circuits are of relatively low impedance while at the same time the input connections are not only of relatively high impedance but also of such configuration circuit-wise that no appreciable power or energy is withdrawn from the distribution system, thereby obviating the need for interposed booster amplifiers and the like as hereinbefore pointed out.

Referring again more particularly to the circuit diagram of Figure 2 it will be seen that the plug connector 76 and the power supply cord 75 include two conductors 82 and 83, one of which is connected to ground while the other is connected through a switch 84 and a series fuse 85 with a choke coil 86 interposed between the supply lead and the power rectifier 87. The latter may be of any suitable type and is here represented as a selenium rectifier having proper current carrying capacity such as 75–100 milliamperes in the present example. The usual output filter for the rectified plate supply current is shown in connection with the output circuit of the rectifier and includes two filter capacitors 89 of preferably 20 microfarads capacity and a series filter resistor 90 of substantially 500 ohms resistance. The output of the filter is the positive B supply terminal 37 and the negative side of the B supply is, of course, ground or chassis.

It should be noted that the series filter choke coil 86 may conveniently be formed by substantially 34 turns of #22 enamel covered wire on a $\frac{5}{16}$'' diameter. This has been found to be effective at all operating frequencies to materially reduce interference from video signals and feedback through the system.

The primary winding 95 of the filament heater transformer 52 is connected to the supply lead 83 at the same point 93 as the rectifier, while the opposite side is connected with the lead 82 through chassis or ground. A neon indicator or pilot light 94 is connected across the primary winding 92 through a series limiting resistor 95 and serves to indicate when the unit is energized. As shown more fully in Figure 1, the switch 84 is provided with an operating handle or lever 96 and the pilot light is provided with an indicating window or jewel 97 on each coupling unit, although if the system is constantly energized and remotely located from the television receivers it is obvious that the switch and pilot light may be eliminated. It should also be observed that since most power supply systems include one grounded and one ungrounded or "hot" lead the power supply plug 76 must be tried in the socket or convenience outlet first in one position and then reversed, in order to bring the chassis into connection with the grounded side of the power supply through the lead 82 of the power supply cord 75, in each case. Thereafter the connection need not be changed.

Figure 3:
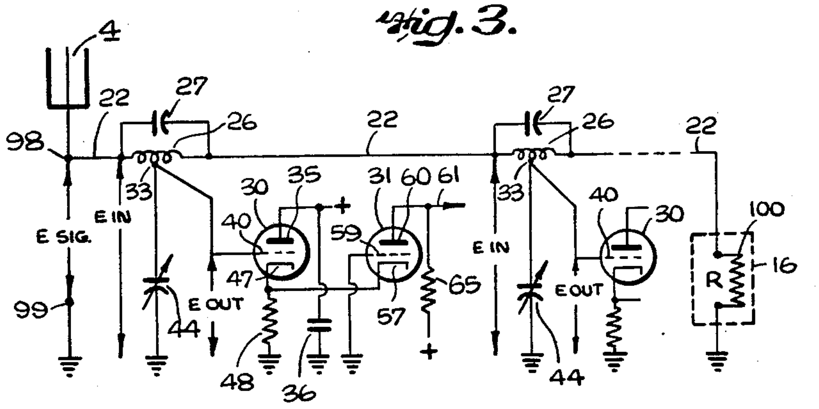
Figure 3 is a further schematic circuit diagram of an equivalent circuit representing the entire system, as shown in Figures 1 and 2, illustrating a principle of operation.

Referring now to Figure 3 and the schematic representation of the entire system, it will be seen that the antenna array 4 provides one side of the signal supply system, and ground or chassis the other, represented by terminals 98 and 99 respectively between which may be represented an indicating signal $E_{sig}$. The signal is then conveyed through the center conductor of the coaxial cable from coupling unit to coupling unit and finally to the terminating impedance at the terminal plug 16 in which a resistor 100 is provided having, in the present example, an ohmic resistance of approximately 52 ohms. The bridged T networks 26—27 at each outlet, in series, are provided along the line, with the tuning capacitors 44 effectively connected between ground and the center tap 33 on each inductance 26. The tap 33 thus becomes an output terminal for the system being connected with the grid electrodes 40 of the several amplifier tubes in the various units. The tap provides a low pass filter effect on an all-pass network, and provides low energy extraction at each tap point, the only impedance being that provided by the grid resistor of one megohm and the internal impedance of the tube between grid and cathode. Furthermore it will be seen from an inspection of Figure 3, that the anodes or plates 35 are grounded through the bypass capacitors 36 and that the grids 59 of the second amplifier tubes in each unit are likewise connected directly to ground, thereby providing a grounded screen between the anodes 60 or output circuits 61 and the cathode coupling provided by cathodes 47 and 57 across the common cathode impedance 48.

The system thus includes a series of bridged T networks connected, between an antenna array and ground, through a single series coaxial cable connection terminating in an impedance or resistor, with taps for single output at the midpoint of each bridged T network. While this output terminal arrangement is not normal for bridged T networks, it has been found to be very effective in the system shown, and with a high input impedance amplifier of the grounded-plate, grounded-grid type and cathode coupling, a high degree of efficiency is obtained with a multiple number of output connections, and wholly without the use of additional booster amplifiers or the like.

The cathode follower amplifier being of high input impedance, presents little or no load to the trunk line or coaxial cable. Therefore, the only appreciable loss is the attenuation of the signal due to the impedance of the cable itself. Thus, with no appreciable loading, in areas of good signal strength, such as most metropolitan areas where distribution systems of this type are most desirable and necessary, there is no appreciable signal loss or need for restoration thereof by additional complicated and costly means heretofore considered necessary. Furthermore by reason of the fact that the signals in a cathode follower amplifier are taken off the cathode, there is no phase difference in the signals at the cathode and the grid, for example, that of the first amplifier tube 30. In addition the output impedance of the cathode follower first amplifier is low, being approximately 75 ohms in the present example, and is designed to match the input impedance of the cathode-coupled second amplifier.

While the capacity between the grid and cathode of a triode such as the type 6J6 tube is low enough to permit free passage of local oscillator radiation to the trunk line or coaxial cable, the grounded grid and cathode coupled amplifier effectively prevent this coupling and radiation, although the signal from a local oscillator of most television receivers is relatively strong as is well known.

It will be seen, therefore, that signals may be received through the coupling units from the successive tap points on the cable and will flow through the connected amplifiers from the first tube to the second, but a reversal of signal flow is met first by the relatively low impedance of the output circuit, 61, secondly, by the grounded screen effect of the grids 59 of the second amplifier tubes, and thirdly, by the low impedance of the cathode coupling circuits. No appreciable gain is realized from the grounded grid amplifier and this design is primarily for isolation.

The resonant trap circuit provided at each outlet by the inductance coil 26 and the shunt capacitor 27 is of great aid in reducing standing waves in the coaxial cable or trunk line. When the trimmer or tuning capacitor 44 is adjusted correctly, the total capacity of the trimmer and the grid-to-cathode capacitance of the first amplifier tube is approximately 29 mmfd. in a circuit of the present example. This capacity value, when taken into consideration with the inductance of the resonant trap circuit or bridged T network 26—27, raises the input impedance of the cathode follower amplifier 30, and when adjusted correctly the signal $E_{out}$ is the same as the signal $E_{in}$ applied to the input of the coil in each case, and except for the slight losses in the cable, is effectively the same as $E_{sig}$. The result is to reduce even further the loading of the trunk line or coaxial cable by the cathode follower amplifier, and to reduce standing waves to a minimum.

From the foregoing description it will be seen that a signal distribution system in accordance with the invention comprises a series of compact, easily manufactured and installed, coupling units adapted to be connected wholly by a single trunk line or coaxial cable interposed between an antenna array or signal source and ground, and is readily adapted to be installed in congested areas since the system per se is of simplified construction and requires but a single antenna array or system for the supply of signals thereto. A maximum number of outlets may be provided in connection with the system because of the series bridged T networks and intermediate tap connections thereon for signal output in connection with relatively high impedance input, low impedance output amplifiers with grounded grid, grounded plate isolation, and cathode coupling.

The system furthermore is highly flexible in installation for the reason that the terminal connections for the various television receivers or the like may be extended to any reasonable distance because of the low impedance provided and the complete isolation of the low impedance output circuits from the trunk line or coaxial cable. Furthermore, the system provides for point to point connection for a single cable in connection with a single antenna array and a single terminating impedance to ground, as is most desirable for simplified and low cost installation.

What is claimed as new and useful is:

1. A multiple unit antenna coupling system comprising in combination, tuned signal collector means, a coaxial cable connected therewith at one end and having a terminating impedance connected to ground at the opposite end, and a plurality of spaced coupling units interposed in and along said cable, each of said coupling units including a series coupling inductance having a center tap, a capacitor connected in shunt with said inductance, a variable capacitor connected between said center tap and ground, and means

EXAMINER providing a high impedance signal output connection from said center tap for signal receiving apparatus.

2. A multiple unit antenna coupling system comprising in combination, tuned signal collector means, a coaxial cable connected therewith at one end and having a terminating impedance connected to ground at the opposite end, and a plurality of spaced coupling units interposed in and along said cable, each of said coupling units including a series coupling inductance having a center tap, a capacitor connected in shunt with said inductance, a variable capacitor connected between said center tap and ground, and means providing a high impedance signal output connection from said center tap, and including an electronic amplifier having a grounded grid circuit and a relatively low impedance output circuit connection adapted for connection with signal receiving apparatus.

3. A multiple unit antenna coupling system as defined in claim 2, wherein the electronic amplifier includes a pair of cathode-coupled amplifier tubes and means in circuit with said first amplifier tube including plate and grid resistors for preventing oscillation therein in response to signals.

4. A signal collection and distribution system for ultra-high frequency signals including in combination, a signal collector, co-axial cable means providing a single signal trunk line connection between said collector and ground, and a series of capacity bridged inductance elements in said trunk line at spaced intervals, each provided with a center tap, a tuning capacitor connected at each center tap, and means including an electronic cathode-coupled grounded-grid amplifier for deriving signals from each of said center taps.

5. In a multiple unit antenna coupling system for television receivers and the like, a coupling unit including a series inductor for said system having input and output terminals and a center tap, a shunt tuning capacitor for said inductor, a variable tuning capacitor of relatively low capacity connected between said center tap and ground for said system, an amplifier tube having grid connections with said center tap connection, a second amplifier tube cathode-coupled to said first amplifier tube and having a grounded grid, and a low impedance output circuit coupled to said second amplifier tube.

6. In a multiple unit antenna coupling system for television receivers and the like, a coupling unit including a series inductor for said system having input and output terminals and a center tap, a shunt capacitor for said inductor, a variable tuning capacitor of relatively low capacity connected between said center tap and ground for said system, a dual triode amplifier tube having dual grid connections with said center tap connection, a second dual triode amplifier tube cathode-coupled to said first amplifier tube and having a pair of grounded grids and a pair of parallel-connected anodes, and a low impedance output circuit coupled to said second amplifier tube and including said pair of parallel-connected anodes.

7. A multiple unit antenna coupling system for television receivers and the like, comprising, in combination, a simple multiple-unit antenna array, a plurality of spaced receiver coupling units and a coaxial cable connecting said coupling units in series with said antenna array and having impedance termination at ground, said coupling units providing a series of bridged T networks along said cable in series one with the other and each including a series inductance element having a center tap thereon, a variable tuning capacitor connected between each of said center taps and ground, means including a grounded-plate, grounded-grid amplifier connected with each of said center taps for withdrawing signals from said system, each of said amplifiers including a high impedance input circuit and a relatively low impedance output circuit for extended coupling connection with said receivers, said amplifiers being characterized further in that each includes a pair of cathode-coupled amplifier tubes each having two grids and two plates connected substantially in parallel, and means in circuit with a first amplifier tube including plate and grid resistors for preventing oscillation therein in response to signals.

8. A multiple unit antenna coupling system as defined in claim 7 wherein a second of said amplifier tubes is provided with grounded grid connections for effecting said grounded grid operation of amplifiers.

MARTIN BETTAN.

REFERENCES CITED

The following references are of record in the file of this patent:

UNITED STATES PATENTS

| Number | Name | Date |
|---|---|---|
| 1,976,910 | Amy et al. | Oct. 16, 1934 |
| 2,393,971 | Busignies | Feb. 5, 1946 |
| 2,431,973 | White | Dec. 2, 1947 |

OTHER REFERENCES

Central Dipoles and Tele Setups, Radio & Television Retailing, March 1948, pp. 80 and 81.